United States Patent [19]

Archer

[11] Patent Number: 4,778,365
[45] Date of Patent: Oct. 18, 1988

[54] FOOD DEPOSITING AND FLATTENING APPARATUS

[76] Inventor: Virgil L. Archer, 2822 Byway, Dallas, Tex. 75211

[21] Appl. No.: 3,077

[22] Filed: Jan. 14, 1987

[51] Int. Cl.⁴ .................. A29C 47/12; A21C 3/04; A21C 9/04; A21C 11/10
[52] U.S. Cl. ..................................... 425/73; 425/101; 425/104; 425/142; 425/215; 425/297; 425/313; 425/324.1; 425/325; 425/327; 425/335; 425/377
[58] Field of Search .............. 426/289, 503, 512, 486; 425/90, 96, 100, 101, 102, 103, 104, 106, 210, 215, 296, 297, 324.1, 325, 327, 335, 340, 343, 394, 436 R, 445, 447, 377, 91, 377, 308, 306, 142, 313, 329, DIG. 60, 404, 405; 99/426, 432, 439, 400.1, 537; 83/613, 623, 639, 679, 697; 17/32

[56] References Cited

U.S. PATENT DOCUMENTS

| | | | |
|---|---|---|---|
| 661,999 | 11/1900 | Kessler | 425/106 |
| 1,958,808 | 5/1934 | Zehender | 425/101 |
| 2,666,947 | 1/1954 | Shaw | 425/306 |
| 2,667,847 | 2/1954 | Carris et al. | 425/297 |
| 2,926,557 | 3/1960 | Ford | 83/617 |
| 2,969,024 | 1/1961 | Johnson | 425/90 |
| 3,001,486 | 9/1961 | Duncan et al. | 425/90 |
| 3,161,157 | 12/1964 | Fries | 425/311 |
| 3,177,822 | 4/1965 | Archer et al. | |
| 3,203,369 | 8/1965 | Archer | |
| 3,280,764 | 10/1966 | Potter et al. | 425/308 |
| 3,422,648 | 1/1969 | Lemelson | 425/145 |
| 3,530,491 | 9/1970 | Rejsa | 425/142 |
| 3,557,403 | 1/1971 | Lemelson | 425/142 |
| 3,557,407 | 1/1971 | Lemëlson | 425/142 |
| 3,770,548 | 11/1973 | Breck | 425/142 |
| 4,075,359 | 2/1978 | Thulin | 425/503 |
| 4,084,466 | 4/1978 | Sipusic et al. | 83/697 |
| 4,193,753 | 3/1980 | Yoshioka | 425/311 |
| 4,395,427 | 7/1983 | Fischer | 426/503 |
| 4,398,881 | 8/1983 | Kobayashi | 425/325 |
| 4,456,446 | 6/1984 | König | 425/102 |
| 4,548,571 | 10/1985 | Suzuki | 425/297 |
| 4,636,301 | 1/1987 | Laramore | 425/104 |
| 4,643,084 | 2/1987 | Gomez | 426/512 |

Primary Examiner—Willard Hoag
Attorney, Agent, or Firm—Hubbard, Thurman, Turner & Tucker

[57] ABSTRACT

Apparatus for preparing extrudable food products prior to cooking includes depositing portions of food product onto a horizontal surface, coating the food portions with flour, vacuuming away excess flour, and incrementally flattening the food portions to a desired thickness. An apparatus for performing this process includes a first flour depositor, a food depositor, a second flour depositor, and a food flattener, all mounted above a conveyor belt. The conveyor belt is mounted atop a supporting chassis which, in addition to providing a mounting base for the components named above, houses the electrical and hydraulic control means for the apparatus. The food depositor comprises conventional extruding means suitable for use with raw dough or ground meat, and a duality of hydraulically activated, high-speed cutter blades. The uniquely designed cutter blades have flattened, essentially planar cutting edge portions which create an aerodynamic shock wave along the line of impact between the blades. The horizontally opposed cutter blades operate to shear off portions of extruded food product and propel the severed portions down onto the conveyor belt, with little or no excess food particles adhering to the high-speed blades. The shock wave serves to force the sheared food portions away from the cutter blades, further reducing the adherence of excess food particles on the blades.

21 Claims, 3 Drawing Sheets

FOOD DEPOSITING AND FLATTENING APPARATUS

BACKGROUND OF THE INVENTION

The present invention relates to processes and apparatus for the commercial preparation of food products, and in particular to a process and apparatus for simultaneously depositing, flouring, and flattening raw food products on a conveyor belt prior to cooking.

Various types of conventional food preparation devices are typically utilized in the high-volume cookie production industry. A typical cookie-making process includes a variety of separate devices, each of which performs one of the specific functions of flour depositing, food depositing, or food flattening. Currently available devices for food depositing and flattening are not well suited for use with more adhesive food products, such as high sugar, high moisture content dough. Typical food depositors employ a plurality of overlapping, relatively slow moving blades relatively positioned in an "iris" configuration to cut off pieces of food product as the food product is discharged from a extruder tube; sticky dough is prone to adhere to these overlapping blades, requiring frequent maintenance to remove the build-up of dough particles. Also, flattening devices of the prior art often cause the pieces of food being flattened to split open, especially along their outer edges. When such splitting occurs, the exposed inner regions of the food pieces are likely to adhere to the components of the flattening device, again requiring frequent maintenance to remove the stuck-on food particles.

As in example of these representative problems and disadvantages, the "dough dropper" disclosed in U.S. Pat. No. 3,203,369 utilizes iris-type cutting blade arrays or "valves" to shear off lumps of dough as the dough exits the extruder tubes. While the use of such multi-bladed iris valves is acceptable for severing most types of cookie dough extrusions, these valves are not suitably reliable when extremely sticky food products are extruded due to the relatively slow operating speed of the three overlapping blades in each valve. Additionally, iris valves are expensive to manufacture and require frequent maintenance due to the large number of moving parts and the abrasiveness of the dough particles which adhere to the blades.

The "flattening and flour dusting device" of U.S. Pat. No. 3,177,822 comprises a two-station apparatus which first distributes and removes excess flour from lumps of cookie dough, then presses the lumps into the desired configuration. The two stations consist essentially of two rows of inverted cups—one row for dusting and one row for flattening. Each cup used for flattening contains a mechanically operated piston which performs the actual flattening of the dough lumps. One pair of hydraulic pistons raises and lowers both rows of cups simultaneously, and a second pair of hydraulic pistons actuates the flattening pistons within the second row of cups. A significant disadvantage of this conventional apparatus is that only one station is responsible for the entire flattening process. When pieces of food product, such as cookie dough, are flattened in a single step, they frequently split open around the edges, exposing the more adhesive interior surface of he food item. This splitting phenomenon results in defective end products, and allows the newly-exposed interior to stick to the cups utilized for flattening. Consequently, the second row of cups must be cleaned frequently to remove the stuck-on food, causing increased maintenance costs and unacceptable periods of down-time.

Another inherent disadvantage of the "flattening and flour dusting device" of U.S. Pat. No. 3,177,822 is that the device is quite complex in both its structure and operation. For example, the plurality of hydraulic pistons and cylinders used to operate the second row of cups requires additional synchronization means, resulting in increased manufacturing and maintenance costs.

In view of the foregoing, it is a object of the present invention to provide a food depositing and flattening apparatus and associated methods which eliminate or minimize the above mentioned and other limitations and disadvantages typically associated with food depositors and flatteners of conventional construction.

SUMMARY OF THE INVENTION

In carrying out principles of the present invention, in accordance with a preferred embodiment thereof, a food depositing and flattening apparatus is provided which uniquely functions to deposit uniformly-sized portions of uncooked food product, such as cookie dough or ground meat, onto a conveyor belt. The food depositing and flattening apparatus further functions to distribute a layer of flour over the entire exterior surface of the food items, then flatten the items to a thickness suitable for cooking while simultaneously removing any excess flour.

The apparatus comprises a food depositor, a food flattener and two flour depositors, all mounted above a conveyor belt on a central chassis. The food depositor further comprises a suitable extruding means positioned above two horizontally opposed, high-speed cutter blades which operate to cut off pieces of food product as the food product exists the extruder. The food flattener comprises six stations, four of which serve to incrementally flatten the food items and two of which function to air-treat the food items. The first of such air-treatment stations consists of a row of inverted cups, each of which is provided with means to simultaneously inject and withdraw air into the interior cavity of the cups. When this first row of cups is lowered onto a row of food items, the injected air serves to distribute flour about the exterior surface of the food items, and the withdrawn air vacuums away excess flour. The second air-treatment station also consists of a row of inverted cups, but these cups include only means for injecting air into the interior cavities thereof. The conveyor belt and two flour depositors are of conventional design and construction.

The high-speed cutter blades utilized in the food depositor of the present invention represent a substantial improvement over the food depositors known in the art. The simple design and operation of these blades reduce both the initial equipment cost and the maintenance cost for the present apparatus, as compared to the complex iris-type valves of the prior art. Furthermore, the high operating speed of the disclosed blades makes the present apparatus suitable for use with more adhesive food products, such as high sugar and moisture content cookie dough or high marrow content ground meat. These sticky products tend to adhere to the slower moving blades of the prior art devices, resulting in inferior products and higher production costs. This disadvantage is alleviated by the present invention because food products do not appreciably adhere to cutter blades moving at the high speed of this invention; the food simply doesn't have time to stick to blades moving this fast.

The unusually high operating speed of the present cutter blades is the result of two significant factors: (1) the blades are directly opposed, so that they need only move back and forth linearly; and (2) the blades are hydraulically activated. When these high speed blades meet beneath the extruder tubes, the shock created by the force of the two blades slamming together propels the food away from the blades, further reducing the opportunity for excess food to stick to the blades. In the event that some food particles do adhere to the blades, the scraping action between the top surface of the blades and the open lower end of the extruder tubes ensures that a build up of food particles on the blades will be avioded. The essentially flush fit between the blades and the open lower end of the extruder tubes also keeps the food product being extruded contained within the extruder tubes until the blades are in the open position. This self-sealing feature prevents waste caused by the inadvertent depositing of food product onto the underlying conveyor belt.

The above-mentioned shock caused by the force of the cutter blades meeting is enhanced by the unique design of the blades. The opposed cutting surface portions of the blades of this invention are of a flattened, essentially planar configuration, unlike the sharpened edges of conventional blades. Rather than slice cleanly through the air during operation, the opposed flattened edges of the cutter blades push the air together, causing an aerodynamic shock at the point of the blades' impact. This aerodynamic shock actually propels the severed portions of food product away from the blades, so that gravity is not the only force used to drop the food items onto the conveyor belt. This feature is the unexpected result of the unconventionally designed cutter blades and is completely unknown in the prior art.

The multi-station flattener of the present invention also offers significant advantages over the prior art flatteners. The present flattener utilizes four stations to incrementally flatten the food items, instead of just one flattening station as known in the art. This sequential flattening process substantially reduces the incidence of split or cracked food items, a common occurence when flattening is performed in a single step. Additionally, the air-treatment stations of the present invention do a superior job of preparing the food items for cooking compared to the prior art devices.

DETAILED DESCRIPTION

While the food depositing and flattening apparatus depicted in FIGS. 1-5 represents a preferred embodiment of the present invention, it is to be understood that the present invention is broader in scope than the limitations recited with respect to the description which follows.

Figure 1:
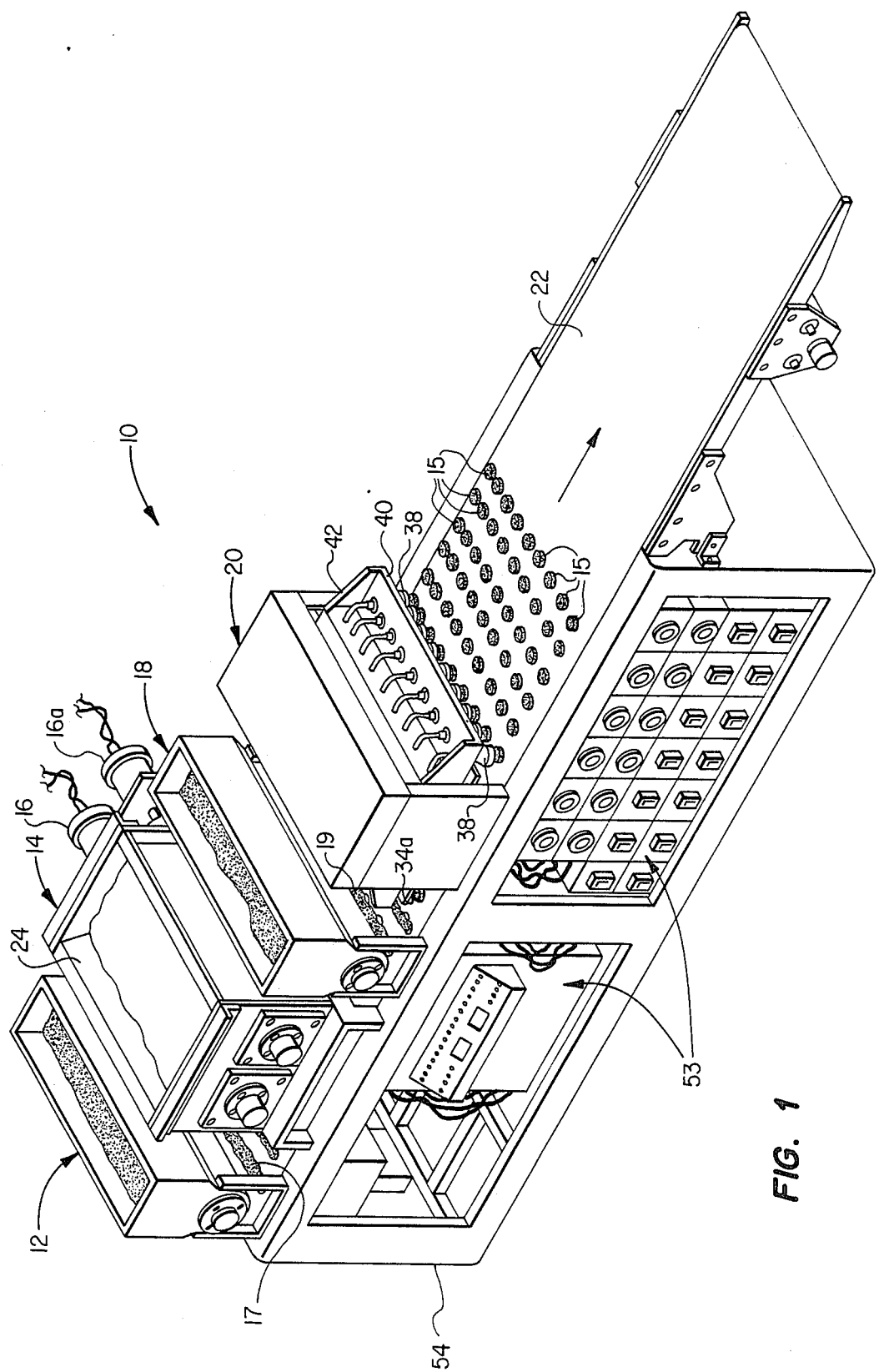
FIG. 1 is an isometric view of a food depositing and flattening apparatus which incorporates unique food depositing and flattening assemblies that embody principles of the present invention.

As shown in FIG. 1, a preferred embodiment of the food depositing and flattening apparatus 10 of the present invention comprises five major components, along with electrical and hydraulic hardware necessary for operation. The major components of the aparatus are a first flour depositor 12, a food depositor 14, a second flour depositor 18, a flattening device 20, and a conveyor belt 22. During operation of apparatus 10, flour depositor 12 starts the process by depositing suitable longitudinally spaced layers of flour 17 across the width of a left end portion of conveyor belt 22. As conveyor belt 22 moves in pre-set increments rightwardly away from flour depositor 12, food depositor 14 deposits a row of nine discs of food product 15 on top of each layer of flour 17 left by flour depositor 12. The food discs 15 produced by food depositor 14 may be cookie dough, biscuit dough, ground meat, or any other food product of suitable consistency. After each row of food discs 15 is deposited onto its corresponding layer of flour 17, conveyor belt 22 moves to position the discs directly beneath flour depositor 18, which then deposits a second layer of flour 19 on top of the food discs 15. Flour depositors 12 and 18 are of conventional design and operation, as shown in U.S. Pat. No. 3,186,358. Finally, conveyor belt 22 moves each row of food discs 15 through flattening device 20, which incorporates a unique six-step process, as subsequently described, to incrementally flatten and air treat each disc while simultaneously vacuuming away any excess flour left by flour depositors 12 and 18.

Figure 2:
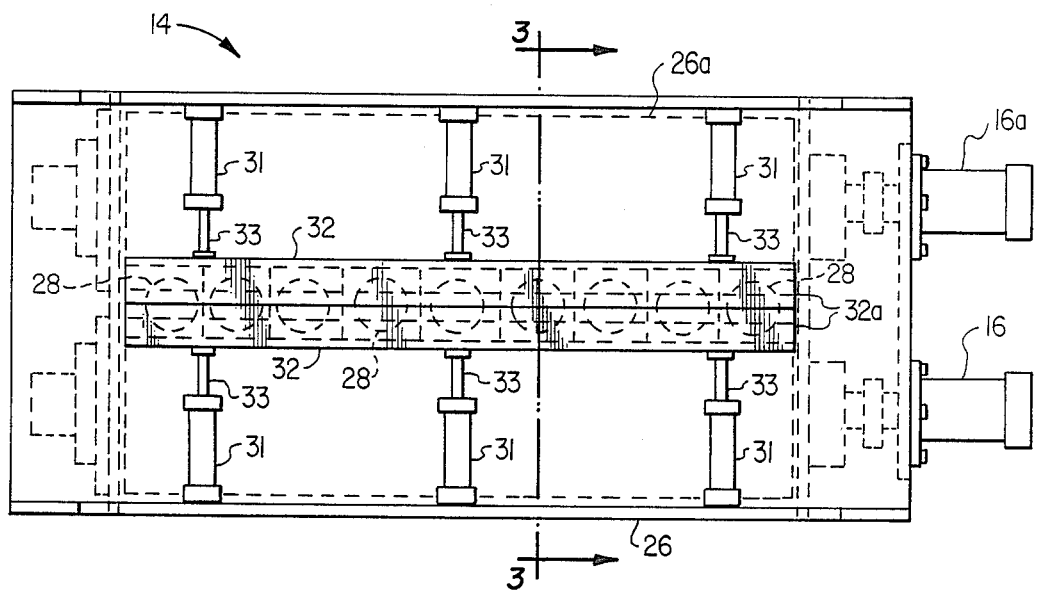
FIG. 2 is an enlarged scale bottom plan view of the food depositor assembly.
Figure 3:
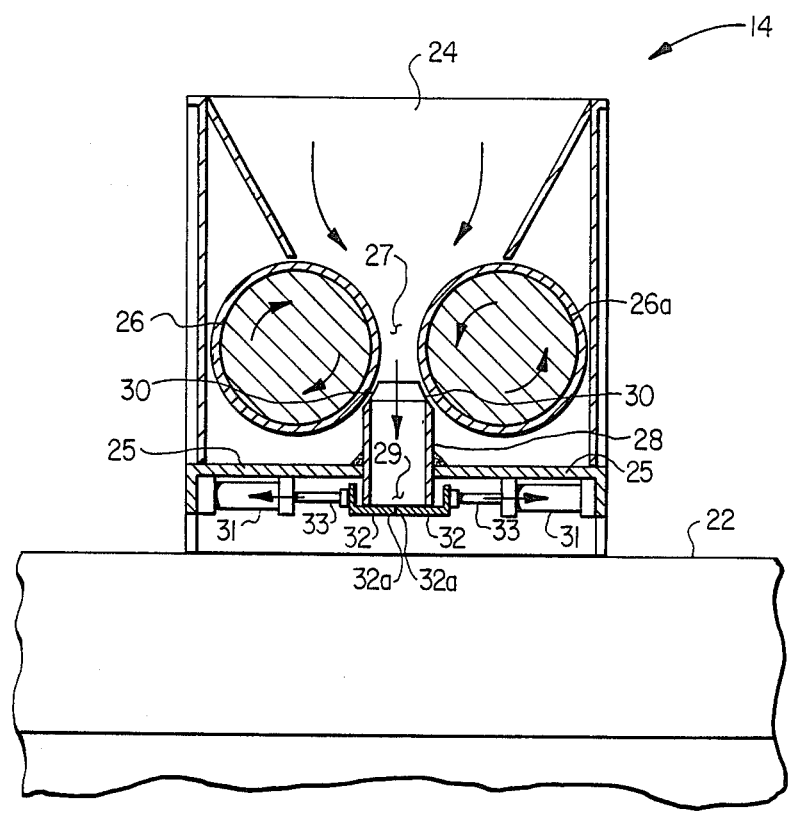
FIG. 3 is a cross-sectional view through the food depositor taken along line 3—3 of FIG. 2.

As shown in FIGS. 2 and 3, food depositor 14 includes a hopper 24, a first roller 26 and a second roller 26a, nine extruder tubes 28, two scraper blades 30, two directly opposed cutter blades 32, and six hydraulic pistons 33. Bulk food products (dough, ground meat, etc.) are placed into hopper 24, which generally directs them to the space 27 separating rollers 26 and 26a. Electric motors 16 and 16a turn rollers 26 and 26a in opposite directions so that the food descending from hopper 24 is forced between rollers 26 and 26a and into extruder tubes 28. Scraper blades 30 are suitably mounted along the tops of extruder tubes 28 and adjacent the rollers 26 and 26a to ensure that the food product does not pass on to the underside of rollers 26 and 26a, but, instead passes through extruder tubes 28.

Cutter blades 32 are mechanically attached to hydraulic pistons 33, which may be set to extend and retract at desired intervals. Hydraulic cylinders 31 are of conventional design and operation and are suitably mounted to horizontal plate 25. Cylinders 31 are actuated by conventional hydraulic means (not illustrated). When pistons 33 are retracted, the opposed cutter blades 32 are separated, thus allowing food product in extruder tubes 28 to pass through bottom end openings 29 therein, the opposed cutter blades 32 being mounted directly beneath the end openings 29. After a desired amount of food product has passed through openings 29, cylinders 31 are pressurized to rapidly extend pistons 33, thereby driving cutter blades 32 together with sufficient force to shear off a disc of food product 15 from each extruder tube 28 and propel the sheared discs 15 downward onto the conveyor belt 22. When hydraulic pistons 33 are extended, the cutting edges 32a of cutter blades 32 meet, and the upper surfaces of cutter blades 32 are flush against the lower ends of extruder tubes 28 so that no food product is allowed to pass through openings 29.

A significant advantage of food depositor 14 over those of the prior art lies in the design and operation of cutter blades 32 and hydraulic pistons 33. Since blades 32 are attached directly to pistons 33, with no other mechanical linkages involved, and since blades 32 need only move linearly with pistons 33, blades 32 operate at a much higher speed than the overlapping blades in th complex iris valves currently known in the art. The higher operating speed makes the food product being processed much less prone to adhere to the blades, thereby virtually eliminating the build-up of stuck-up food particles. Also, blades 32 have flattened, essentially planar opposed cutting edges 32a, not sharpened like conventional blades. This unique configuration yields a surprising and important result; an aerodynamic shock is created by the impact of the flat cutting edges 32a, literally propelling food discs 15 downward onto conveyor belt 22. This aerodynamic force drives the food product away from cutter blades 32, further preventing the unwanted adherence of food particles to blades 32. Accordingly, high-speed cutter blades 32 require considerably fewer maintenance periods to clean off the residue of food particles than do iris valve blades. The high operating speed and unique edge design of blades 32 make food depositor 14 especially well suited for unusually adhesive food products which do not work well in conventional food depositors. Foods such as high sugar and moisture content cookie dough and high bone marrow content ground meat make exceptional end products, but cannot be easily processed with existing devices. The present invention overcomes the problems associated with sticky food products, thus enabling the efficient production of better-tasting items.

Figure 4:
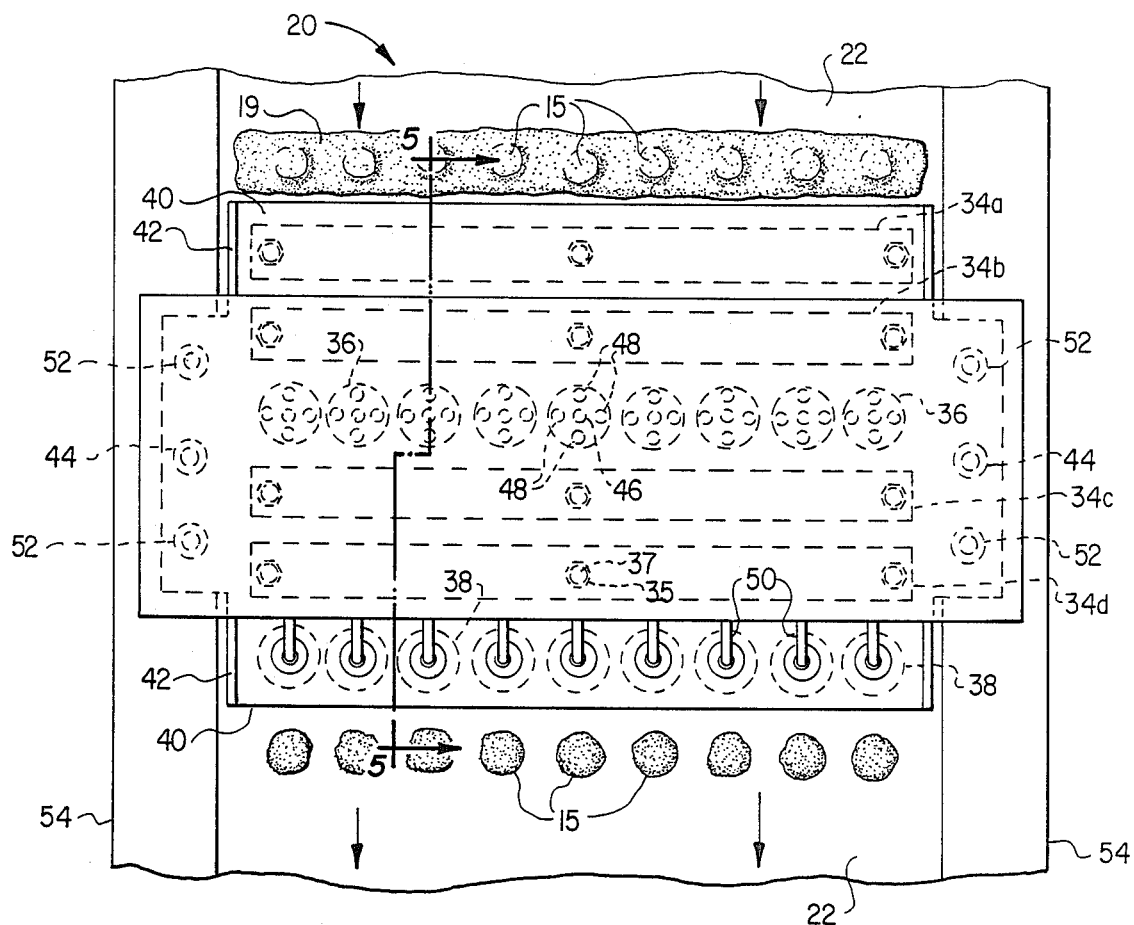
FIG. 4 is an enlarged scale top plan view of the food flattener assembly.
Figure 5:
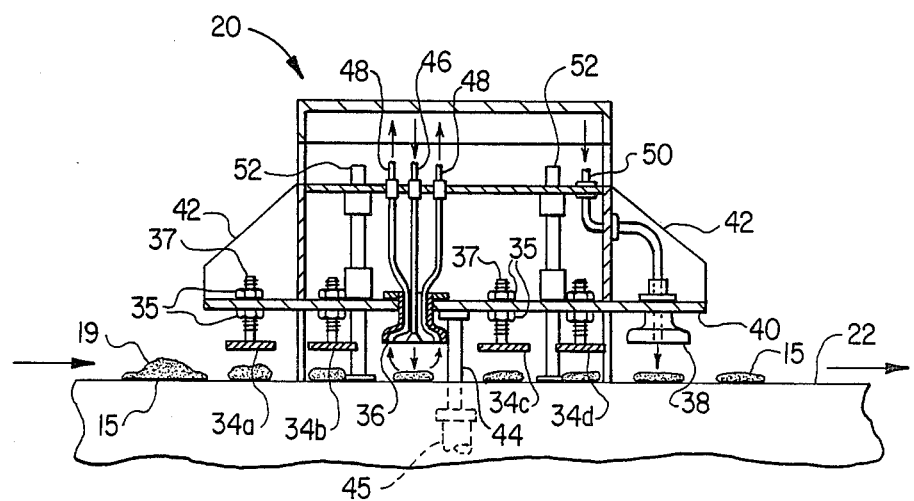
FIG. 5 is a cross-sectional view through the food flattener assembly taken along line 5—5 of FIG. 4.

As shown in FIGS. 4 and 5 flattening device 20 preferably includes six stations, each designed so that an entire row of food discs 15 can be treated at once. Four of these preferred six stations comprise flat bars 34, namely, 34a, 34b, 34c, and 34d, and the remaining two stations comprise rows of inverted cups 36 and 38. Flat bars 34, and cups 36 and 38, are suitably attached to base plate 40 of frame 42. Frame 42 is slidably mounted on vertical bearing shafts 52. Base plate 40 is attached to hydraulic pistons 44 which, when extended and retracted, raise and lower all six stations simultaneously. Pistons 44 are powered by hydraulic cylinders 45, which are of conventional design and operation and are suitably attached to chassis 54. The conventional hydraulic means for pressurizing cylinders 45 are not shown, for clarity. The hydraulic pressure used to pressurize cylinders 45 and actuate pistons 44 can be readily adjusted to control the rate and degree of movements of the six stations.

Flat bars 34 are permanently connected to threaded studs 37 which are removably connected to base plate 40 by means of nuts 35. The height of bars 34, and the degree of flattening inparted thereby, can be adjusted by re-positioning nuts 35 along threaded studs 37. Preferably, bar 34a is mounted at the maximum desired height above conveyor belt 22, so that bar 34a imparts a minimum degree of flattening to food discs 15. Flat bars 34b, 34c, and 34d are mounted progressively closer to conveyor belt 22, so that bar 34d performs the maximum amount of flattening of food discs 15. Flat bars 34 extend across the width of conveyor belt 22, so that each bar 34 flattens a complete row of food discs 15 with each successive retraction of pistons 44.

Cups 36 are mounted in a row parallel to flat bars 34, and positioned between flat bars 34b and 34c. The number of cups 36 corresponds to the number of extruder tubes 28 contained in food depositor 14; as mentioned above, the preferred embodiment of the present invention includes nine cups 36. Each cup 36 is provided with a centrally located air inlet tube 46, and four peripherally located vacuum tubes 48. When cups 36 are lowered on the food discs 15, substantially dry, clean air can be injected into cups 36 through inlet tubes 46 to air-treat the surface of the food discs. The air treatment effected by cups 36 ensures the even distribution of flour about the surface of the food discs 15, and toughens the surface layer of the discs to reduce the amount of cracking around the edges caused by flattening. Excess flour can then be withdrawn from said food discs through vacuum tubes 48. Preferably, vacuum tubes 48 lead to a suitable reservoir so that excess flour is reclaimed rather than discarded.

Cups 38 are mounted to base plate 40 in the same general manner as cups 36, but cups 38 are positioned along the exiting end of flattener 20, thus comprising the final treatment station for the food discs 15 on conveyor belt 22. Cups 38 are equipped with centrally-located air inlet tubes 50, through which air can be injected to fill the cavities of cups 38. When cups 38 are lowered into position covering the food discs 15, the blast of substantially dry, clean air through tubes 50 serves to further treat the outer surface of the food discs 15 to prepare them for cooking.

As pistons 44 are extended and retracted base plate 40 is raised and lowered, thereby raising and lowering flat bars 34 and cups 36 and 38. The hydraulic actuating means for pistons 44 is synchronized with the driving means for conveyor belt 22, so that conveyor belt 22 is stationary when base plate 40 is in the lowered position, but when base plate 40 is in the raised position, conveyor belt 22 moves a pre-set distance to position each row of food discs 15 under the next successive station. Food discs 15 move through flattening device 20, starting with flat bar 34a and ending with cups 38 (from left to right as depicted in FIG. 5). Each row of discs 15 is initially positioned beneath flat bar 34a, which slightly flattens discs 15 as base plate 40 is lowered and raised. When base plate 40 reaches its raised position, conveyor belt 22 moves to position discs 15 beneath flat bar 34b, which then further flattens discs 15 as base plate 40 is again lowered and raised. Next, with base plate 40 raised, conveyor belt 22 moves to position the food discs 15 beneath inverted cups 36. When base plate 40 is lowered, each cup 36 completely covers a single food disc 15 and air is injected and withdrawn through tubes 46 and 48, as mentioned above. After the excess flour has been vacuumed away through tubes 48, base plate 40 is raised and the row of food disc 15 is re-positioned beneath flat bar 34c. Flat bars 34c and 34d then operate in succession the same as bars 34a and 34b, described above, to further flatten discs 15 to a pre-determined thickness. Food discs 15 are incrementally flattened due to the progressively lower mounting height of bars 34a through 34d, relative to conveyor belt 22, with bar 34a being the highest and bar 34d being the lowest. After flat bar 34d imparts the final degree of flattening to food discs 15, base plate 40 raises and discs 15 are positioned beneath cups 38. Base plate 40 is again lowered so that each cup 38 covers a single disc 15, and air is injected into cups 38 through tubes 50 as described above. Base plate 40 is then raised and food discs 15 are moved away from flattening device 20 by conveyor belt 22, thus completing the process of the present invention.

Flattening device 20 offers at least two significant advantages over prior art flatteners. First, flattening of the food discs 15 is performed in four incremental steps by flat bars 34a–34d, instead of just one step as in the prior art. This four-step process greatly reduces the amount of splitting around the edges of the food items, a problem that is common with one-step flatteners. Second, cups 38 provide an additional air-treatment step that is unknown in the art. This extra step results in higher quality products by causing the formation of a protective skin over the surface of the food items. This step is especially important when more adhesive food products are processed, since the protective skin greatly simplifies handling of the food items immediately prior to cooking.

For the apparatus of the present invention to operate effectively, the electric motor used to drive conveyor belt 22 must be synchronized with the motors driving flour depositors 12 and 18, along with motors 16 and 16a and hydraulic pistons 33 and 44. When such synchronization is obtained through conventional means, the preferred apparatus is capable of depositing a layer of flour 17 on belt 22, depositing a row of food discs 15 on a layer of flour 17 on belt 22, depositing a layer of flour 19 on top of a row of food discs 15, and either flattening or air treating six rows of floured food discs 15, all simultaneously. For convenience, the electrical and hydraulic control mechanisms 53 needed for proper synchronization of the apparatus may be mounted within chassis 54, as shown in FIG. 1. Chassis 54 also serves as the support means for conveyor belt 22, flour depositors 12 and 18, food depositor 14, and flattener 20.

The food discs 15 exiting the flattener of the present invention are ready to be cooked without my further pre-cooking treatment. The discs may be removed from conveyor belt 22, or deposited by conveyor belt 22 onto another, separate, conveyor means, and transferred directly into an oven for cooking. Alternatively, the discs 15 may be transferred to a suitable freezing or freeze drying chamber which preserves the discs for cooking at a later date.

The food preparation apparatus of this invention offers advantages over any of the devices presently known in the art. The high-speed, uniquely designed cutter blades utilized in the present invention are simpler to make, more reliable, and more effective than the blades currently used in the art. The performance of the blades makes this invention particularly well-suited for use with unusually adhesive food products, a use for which prior art devices do not perform well. Additionally, the six-staged flattening device of this invention is far superior to anything known in the art. The four-step flattening process in conjunction with the two air-treatments stations create a more consistently perfect product and reduce the amount of maintenance time as well. The end result is that the present invention produces better food items and operates more efficiently than any prior art devices or combination thereof.

The foregoing detailed description is to be clearly understood as being given by way of illustration and example only, the spirit and scope of the present invention being limited solely by the appended claims.

What is claimed is:

1. Food preparation apparatus comprising:
   (a) at least one hollow food depositing member having an open lower end facing and spaced apart from a horizontal surface;
   (b) extruding means for forcing a food product downwardly through said hollow member;
   (c) a duality of cutter blades having cutting edge portions in direct opposition to each other, said cutter blades being mounted below said open lower end of said hollow member and being horizontally movable between first and second positions, in which said cutting edge portions are spaced sufficiently apart in said first position to allow the unrestricted passage of said food product through said open lower end, and in said second position said cutting edge portions engage each other to sever a portion of the food product exiting said open lower end and cause the severed food product to be deposited on said horizontal surface, said cutter blades in said second position being essentially flush with said open lower end;
   (d) means for selectively moving said cutter blades rapidly between said first and second positions thereof;
   (e) means for depositing a layer of flour on top of and beside food product portions deposited on said horizontal surface;
   (f) means for flattening food product portions deposited on said horizontal surface, comprising:
      (1) a plurality of flattening means sequentially operative to incrementally flatten food product portions deposited on said horizontal surface;
      (2) first air-treatment means for utilizing a forced flow of substantially dry, clean air to distribute flour on the exterior surfaces of said food product portions and vacuum away excess flour; and
      (3) second air-treatment means for utilizing a forced flow of substantially dry, clean air to toughen the exterior surfaces of said food product portions.

2. Apparatus as claimed in claim 1 wherein said horizontal surface is a conveyor belt.

3. Apparatus as claimed in claim 1 wherein said cutter blades are attached to horizontally opposed hydraulic pistons, operable to selectively adjust the speed at which said cutter blades move between said first and second positions thereof.

4. Apparatus as claimed in claim 1 further comprising means for depositing a layer of flour beneath the food product portions deposited on said horizontal surface.

5. Apparatus as claimed in claim 1 in which there are nine hollow food depositing members.

6. Apparatus as claimed in claim 1 wherein said cutting edge portions are essentially flat, parallel, abuttable surfaces.

7. Food preparation apparatus comprising:
   (a) a plurality of flattening means sequentially operative to incrementally flatten food product portions deposited on said horizontal surface;
   (b) means for depositing a layer of flour on top of and beside food product portions deposited on said horizontal surface;
   (c) first air-treatment means for supplying a forced flow of substantially dry, clean air to distribute flour on the exterior surfaces of said food product portions and means to vacuum away excess flour; and (d) second air-treatment means for supplying a forced flow of substantially dry, clean air to toughen the exterior surfaces of said food product portions.

8. Apparatus as claimed in claim 7 wherein said horizontal surface is a conveyor belt.

9. Apparatus as claimed in claim 7 further comprising means for depositing a layer of flour beneath the food product portions deposited on said horizontal surface.

10. Apparatus as claimed in claim 7 which comprises four flattening means.

11. Apparatus as claimed in claim 7 further comprising:
 (e) means for depositing food products on a horizontal surface, comprising:
  (1) at least one hollow food depositing member having an open lower end facing and spaced apart from said horizontal surface,
  (2) extruding means for forcing a food product through said hollow member,
  (3) a duality of cutter blades having cutting edge portions in direct opposition to each other, said cutter blades being mounted below said open lower end of said hollow member and being horizontally movable between first and second positions, in which said cutting edge portions are spaced sufficiently apart in said first position to allow the unrestricted passage of said food product through said open lower end, and in said second position said cutting edge portions engage each other to sever a portion of the food product exiting said open lower end and cause the severed food product to be deposited on said horizontal surface, said cutter blades in said second position being essentially flush with said open lower end, and
  (4) means for selectively moving said cutter blades rapidly between said first and second positions thereof.

12. Apparatus as claimed in claim 11 wherein said cutting edge portions are essentially flat, parallel, abuttable surfaces.

13. Apparatus as claimed in claim 7 wherein said flattening means comprise flat bars mounted to a means for vertically positioning said flat bars between a first and second position, in which said flat bars are raised to a maximum desired height above said horizontal surface in said first position, and in said second position said flat bars are at a minimum desired height above said horizontal surface.

14. Apparatus as claimed in claim 13 wherein said means for vertically positioning said flat bars comprise hydraulic pistons operable to selectively adjust the vertical movement of said flat bars between said first and second positions.

15. Apparatus as claimed in claim 7 wherein said first air-treatment means comprise:
 (a) one or more inverted cups;
 (b) means for injecting substantially clean, dry air into said cups;
 (c) means for recovering excess flour from said portions of food product by evacuating said cups; and
 (d) means for vertically positioning said cups between a first and second position, in which said cups are raised to a maximum desired height above said horizontal surface in said first position, and in said second position said cups are at a minimum desired height above said horizontal surface.

16. Apparatus as claimed in claim 15 wherein said means for vertically positioning said cups comprise hydraulic pistons operable to selectively adjust the vertical movement of said cups between said first and second positions.

17. Apparatus as claimed in claim 7 wherein said second air-treatment means comprise:
 (a) one or more inverted cups;
 (b) means for injecting substantially clean, dry air into said cups; and
 (c) means for vertically positioning said cups between a first and second position, in which said cups are raised to a maximum desired height above said horizontal surface in said first position, and in said second position said cups are at a minimum desired height above said horizontal surface.

18. Apparatus as claimed in claim 17 wherein said means for vertically positioning said cups comprise hydraulic pistons operable to selectively adjust the vertical movement of said cups between said first and second positions.

19. Food preparation apparatus comprising:
 (a) at least one hollow food depositing member having an open lower end facing and spaced apart from a horizontal surface;
 (b) extruding means for forcing a food product downwardly through said hollow member;
 (c) a duality of cutter blades having cutting edge portions in direct opposition to each other, said cutter blades being mounted below said open lower end of said hollow member and being horizontally movable between first and second positions, in which said cutting edge portions are spaced sufficiently apart in said first position to allow the unrestricted passage of said food product through said open lower end, and in said second position said cutting edge portions engage each other to sever a portion of the food product exiting said open lower end and cause the severed food product to be deposited on said horizontal surface, said cutter blades in said second position being essentially flush with said open lower end;
 (d) means for depositing a layer of flour beneath the food product portions deposited on said horizontal surface;
 (e) means for depositing a layer of flour on top of and beside food product portions deposited on said horizontal surface;
 (f) a plurality of flattening means mounted above said horizontal surface, sequentially operative to incrementally flatten food product portions deposited on said horizontal surface;
 (g) first air-treatment means for supplying a forced flow of substantially dry, clean air to distribute flour on the exterior surfaces of said food product portions and means to vacuum away excess flour; and
 (h) second air-treatment means for supplying a forced flow of substantially dry, clean air to toughen the exterior surfaces of said food product portions.

20. Apparatus as claimed in claim 19 wherein said horizontal surface is a conveyor belt.

21. Apparatus as claimed in claim 19 wherein said cutting edge portions are essentially flat, parallel, abuttable surfaces.

* * * * *